(No Model.)
H. J. MAXWELL.
INCUBATOR.
No. 511,153. Patented Dec. 19, 1893.
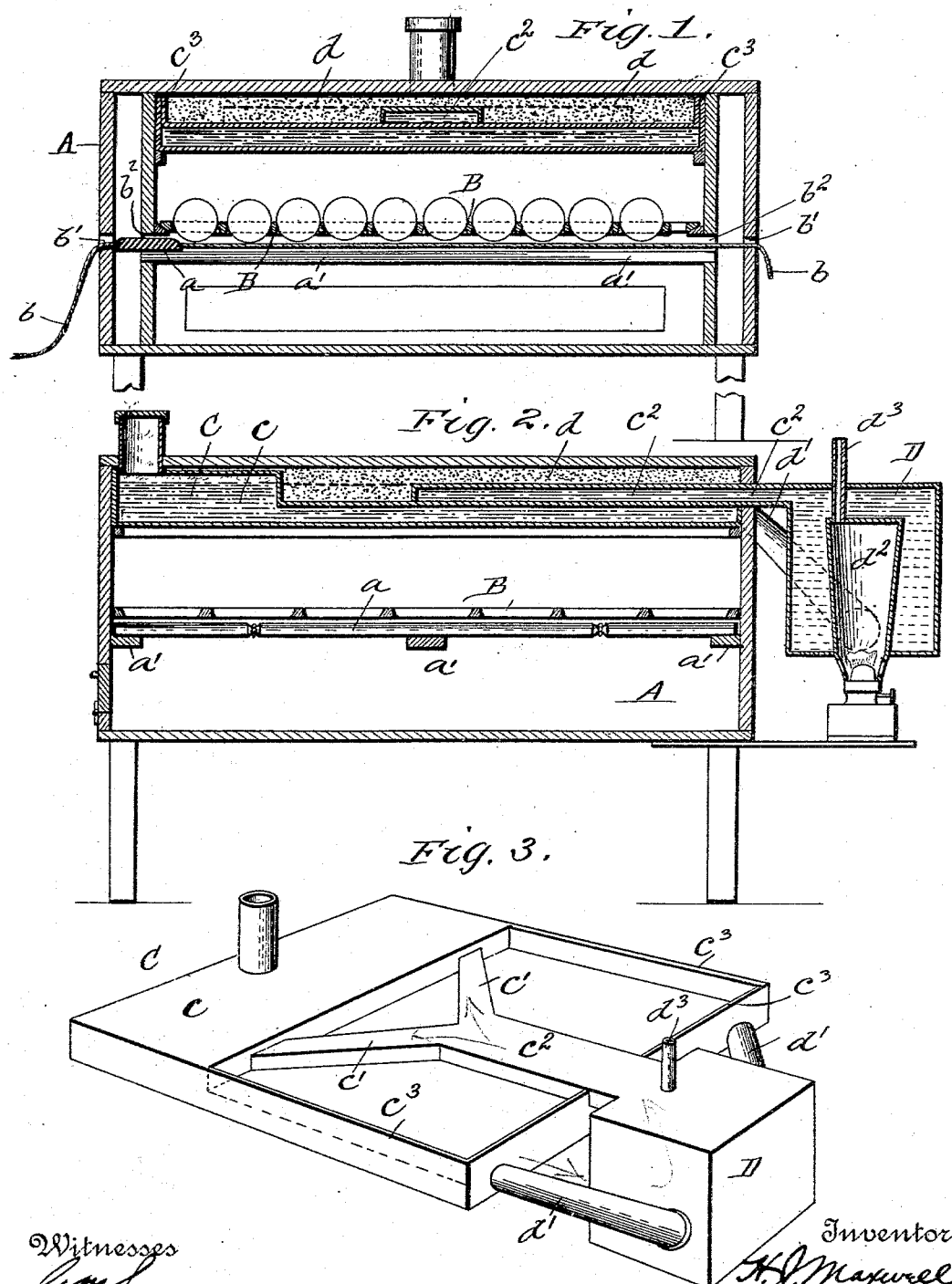
Witnesses
G. M. Lausaure
James Austin
Inventor
H. J. Maxwell
By Alexander & Davis
Attorneys

UNITED STATES PATENT OFFICE.

HARLEY J. MAXWELL, OF CARDINGTON, OHIO.

INCUBATOR.

SPECIFICATION forming part of Letters Patent No. 511,153, dated December 19, 1893.

Application filed October 24, 1893. Serial No. 489,044. (No model.)

*To all whom it may concern:*

Be it known that I, HARLEY J. MAXWELL, a citizen of the United States, residing at Cardington, in the county of Morrow and State of Ohio, have invented certain new and useful Improvements in Incubators, of which the following is a specification, reference being had therein to the accompanying drawings, in which—

Figure 1 is a vertical sectional view of the apparatus; Fig. 2, a similar view taken at right angles to the line on which Fig. 1 is taken; Fig. 3, a detail perspective of the water reservoir and attached heater.

This invention is designed to produce an extremely compact, cheap and efficient incubator, and it consists of certain novel features of construction and arrangement of parts, which are hereinafter described and particularly pointed out in the claims.

In the drawings, A designates the box or casing, and B the removable egg-rack, consisting of a series of intersecting rods which form individual egg-pockets, the lower sides of the eggs projecting below the rack as shown. The eggs are thereby supported freely in the rack and practically only rest on the rods at their ends, thus giving the moisture free access to their entire surface. To turn the eggs over, a reciprocable bar $a$ is employed, which is supported by the horizontal rods $a'$, directly below the egg-rack and close to the same. There are three supporting rods, one at each side of the casing and one midway between the two, and the narrow bar $a$ rests directly on the same and extends entirely across the box. To turn the eggs the bar is simply drawn across the box by means of cords $b$, which extend out through openings $b'$ in opposite sides of the casing, which action raises the eggs slightly from the bars and revolves them about half a turn and drops them gently back into the pockets. The upper longitudinal edges of the bars are beveled to avoid breaking the eggs. The bar when at the ends of its path rests in horizontal slots $b^2$ formed in the inner wall of the double sides of the casing and is therefore out of the way and does not shield the moisture from the eggs. It is essential, in order to obtain the maximum hatch that the warm moisture (which is usually evaporated from a vessel placed in the bottom of the box) have a free and uniform access to the eggs throughout the hatching process, and it is also necessary that the eggs be given, as nearly as possible, but a half turn each time they are revolved; it is these necessary results which the construction described is designed to, and does in practice, produce. It will be observed also that the slots $b^2$ and openings $b'$ form ventilating openings to ventilate the interior of the box.

The heating apparatus consists of a horizontal water reservoir C, through which water is caused to circulate by the heater D, located at one side of the box. The reservoir is rectangular in shape, so as to fit within the box, immediately above the egg-tray, and is of a uniform depth except at its rear end where it is enlarged or deepened, the enlargement $c$ projecting upwardly from the main part and extending entirely across the same. Extending upwardly from this enlargement is a capped filling tube which also serves as a vent for the generated vapor. Entering the front wall or shoulder of the enlargement $c$ are two flat tubes or flues $c'$ which extend forwardly and converge into a main flat tube $c^2$, which latter extends forward and connects with the top of the heater. The tubes $c'$ $c^2$ are formed on the upper surface of the reservoir and they are preferably shallower than the enlargement into which they empty. The reservoir has formed around its side and front edges an upwardly-extending flange $c^3$ which connects with the ends of the enlargement; this flange not only braces the reservoir against warping but also serves to confine the non-conducting material $d$ filled in between the cover of the casing and the reservoir. The heater is of any suitable shape and has its lower portion connected to the front edge of the reservoir by upwardly extending tubes $d'$. The combustion chamber $d^3$ of the heater extends up into the heater to near the entrance to tube $c^2$ and it is enlarged toward its upper end to increase its heating surface and its efficiency. A small vent pipe $d^3$ extends from the upper end of the combustion chamber out through the top of the heater, to create the necessary draft. A lamp is supported at the lower open end of the combustion chamber.

In operation the heated water flows from the top of the heater through the tubes $c^2$ $c'$ into the enlargement $c$ which forces the cooler water from thence forward through the main reservoir and back into the heater; this continuous circulation is kept up so long as the lamp is kept lighted. The advantage in the peculiar form of heater shown lies in the fact that the greatest heat is applied just where it is needed, that is, at the top of the heater, whereby the water will be made hottest directly at the entrance to the main circulating tube and be forced into the same, thereby insuring a positive circulation. The peculiar form of reservoir is advantageous in that it furnishes a practically uniform heating surface, which is necessary in order to obtain a full hatch. By carrying inlet tubes over the top of the reservoir and discharging them into the opposite ends of a chamber extending across the rear end of the reservoir a practically uniform distribution of the heat is obtained, as has been ascertained by a practical test.

In the incubators heretofore patented the non-uniformity of the heating surface results principally from improperly conveying and distributing a sufficient quantity of the hot water along the rear end of the reservoir and over its entire radiating surface; in some of these apparatuses the non-uniformity has been attempted to be compensated for by inclining the egg-tray upward toward its rear end to bring it nearer to the heating reservoir, but this arrangement has not proven satisfactory. The present form of heater overcomes this objection by carrying the hot water over the top of the reservoir and emptying and distributing it along its rear edge without wasting any of the heat. The enlargement along the rear end of the heater is also desirable from the fact that it keeps the conveying tubes always full of water, which is necessary in order to insure a full and steady circulation.

Having thus fully described my invention, what I claim is—

1. In an incubator, the combination of a casing, an egg-rack, a heating reservoir supported above the egg-tray and consisting of a single main chamber or compartment, said chamber being enlarged upwardly along its rear edge to increase its capacity at that point, a tube connected to the front edge of the enlargement and extending forward on top of the main-reservoir, a heater connected at its upper end to said tube, and return tubes connecting the front edge of the main reservoir to the lower end of the heater, substantially as described.

2. In an incubator, the combination of a casing, an egg-tray, means for turning the eggs therein, a heating reservoir fitted in the casing above the egg-tray, said reservoir consisting of a main part, enlarged upwardly along its rear end, conveying tubes leading out of the front edge of said enlargement and extending forward upon the top of the reservoir, said tubes being merged into one, a water heater connected to the tubes, and return tubes extending from the front edge of the reservoir into the heater, substantially as described.

In testimony whereof I affix my signature in presence of two witnesses.

HARLEY J. MAXWELL.

Witnesses:
CHARLES D. DAVIS,
WM. R. DAVIS.